S. GARDINER, Jr.
Lighting Gas by Electricity.
No. 6,377. Reissued April 13, 1875.
FIG I
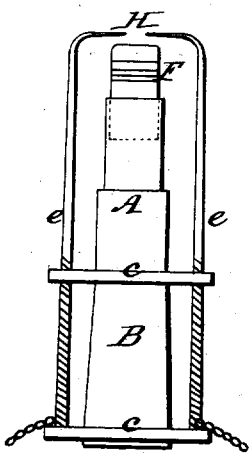
FIG II
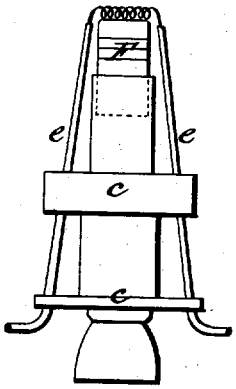
WITNESSES
John E. Laing
J. H. Rutherford
INVENTOR
Samuel Gardiner Jr.
By Johnson & Johnson
his Attys
N. PETERS, Photo-Lithographer, Washington, D. C.

UNITED STATES PATENT OFFICE.

SAMUEL GARDINER, JR., OF WASHINGTON, DISTRICT OF COLUMBIA.

IMPROVEMENT IN LIGHTING GAS BY ELECTRICITY.

Specification forming part of Letters Patent No. 45,241, dated November 29, 1864; reissue No. 6,377, dated April 13, 1875; application filed February 23, 1875.

*To all whom it may concern:*

Be it known that I, SAMUEL GARDINER, Jr., formerly of New York city, now of the city of Washington, in the District of Columbia, have invented new and useful Improvements in Burners for Electrical Gas-Lighting Apparatus; and I do hereby declare that the following is a full, clear, and exact description of the same, reference being had to the accompanying drawings, making part of this specification.

Prior to my invention the tip or burner proper was of metal, as was also the pillar or stem which united it to the gas-fixtures, and the wires running up by the sides of the burner to conduct the electricity to the orifice were insulated by passing them through glass tubes. These were necessarily in sections or short pieces, and their joints were more or less open for the escape of the electricity. The electric current under this construction was constantly liable to return to the earth, even with the best insulation that could be used up by the side of the burner, and the lighting of the gas was thereby rendered unreliable, whether by the electric current or by spark. As an additional protection against the escape of the electricity to the earth the conducting-wires were coated with gutta-percha, or other non-conducting covering, over which the glass sections were secured. The rubber insulation was, however, liable to be destroyed by the heat of the wires, which were in constant close contact with the flame, and liable to melt the rubber covering, and thereby throw the conducting-wires out of adjustment. The main dependence for insulation was, therefore, upon the glass tubing.

In my patent of December 22, 1857, extended for seven years from the 22d of December, 1871, I there used the combination of a non-conducting pillar for the wires with a gas-burner, by which the conducting-wires and their platina coils were insulated from both the gas-fixtures and the burner. Such non-conducting pillar was, however, independent of the burner and its pillar, and was therefore both expensive and complicated, as the separate non-conducting pillar required a separate support from the burner, and entailed much labor and time in fitting up the apparatus.

The object of this invention is to light illuminating-gas with more certainty than by passing the current of electricity across an ordinary metal gas-burner, either by a platina coil, or by arranging wires with a break passing the spark of electricity into the flame of gas.

In order to light the gas, great care has to be used to keep the platina coil from coming too near the metal burner, as the least touch to the metal gas-burner would destroy the circuit, and prevent the igniting of the gas; also, the same or more care has to be taken when a current of electricity is passed across a break over the gas-burner, as a spark will take the nearest and best conductor to the earth. Therefore it has become important to arrange a gas-burner so that when once properly adjusted, and having a perfect isolator at the orifice or tip of the gas-burner, it will at all times light the gas with certainty.

After trying many experiments, I find the lava tip to be the best and safest insulator. The platina coil or the points of the wire may rest firmly upon the lava tip, and when once adjusted will light the gas with certainty. I also employ a burner-pillar, which affords a perfect and reliable isolation of the gas-fixtures from the conducting-wires, so that the latter, without insulation, can be used up by the side of said pillar in lighting gas by the electric spark.

It will be seen that the non-conducting pillar forms a portion of, and a direct support for, the burner, and has many advantages over a non-conducting pillar detached from and arranged by the side of the burner.

The accompanying drawings serve to illustrate the application of my invention.

To enable others skilled in the art to make and use my invention, I will proceed to describe the construction and operation of the same.

Figure 1 shows a gas-burner, which is lighted by the electric spark.

B is an isolated section of the gas-burner, made of hard rubber. A is the iron pillar of the gas-burner. F is the lava tip, which is also a perfect isolator. Isolators *c c* support the conducting-wires up the side of the gas-burner. *e e* are the conducting-wires, and when over the lava tip the two points are brought near together, having a small break over and near the orifice of the gas-burner. The two points at H should be placed so that the spark will pass through the flat portion of the flame of gas. The lava tip prevents the spark from returning into the gas-burner, therefore making it certain to light several burners by one discharge of electricity. The insulated section B of the burner serves as a safeguard against the possibility of the electricity passing from the conducting-wires *e e* before reaching the orifice of the burner, and even allow bare wires to be used up by the sides of the burner-pillar, and thereby saving much expense and considerable trouble in insulating the wires about the burner. The employment of a non-conducting pillar as a support for and part of the burner, with the separate electrodes in lighting by spark, is rendered necessary, because the volume of electricity is more intensified to give the required body to the spark, and the latter would thereby be more liable to jump into the gas-fixtures and pass to the earth if a metal pillar were used.

Fig. 2 shows a gas-burner made wholly of metal, except the tip, which is made of lava.

The isolators, marked *c c*, support the conducting-wires, which are connected by a platina coil, which rests on the top of the lava tip, and near the orifice of the gas-burner, and when once adjusted it will light the gas with certainty. Nor is the volume of electricity required to be so intensified when the coil is used as when lighting by spark, and therefore an ordinary metal pillar can be used with the lava tip.

Having thus described the construction and operation of my invention, I claim, broadly—

1. A tip of lava or other non-conducting material, in combination with an apparatus for lighting gas by electricity.

2. In apparatus for lighting gas by electricity, a non-conducting pillar-burner, whereby the conducting-wires are isolated from the gas-fixtures.

3. The combination, in a burner for lighting gas by electricity, of a non-conducting burner-pillar, B, with a lava tip, F, substantially as and for the purpose set forth.

4. The combination, in apparatus for lighting gas by electricity, of the lava tip with the conducting-wires *e e* and their supporting-insulators *c c*, substantially as described.

5. The combination, in a burner for lighting gas by electricity, of a lava tip with a platina coil and a metal pillar, substantially as and for the purpose herein set forth.

6. The combination, in a burner for lighting gas by electricity, of a non-conducting pillar, B, with a lava tip, D, and an intervening metallic pillar or nipple, A, substantially as and for the purpose herein set forth.

In testimony whereof I have hereunto set my hand in presence of two subscribing witnesses this 2d day of February, A. D. 1875.

SAML. GARDINER, JR.

Witnesses:
A. E. H. JOHNSON,
J. W. HAMILTON JOHNSON.